Figure 3:
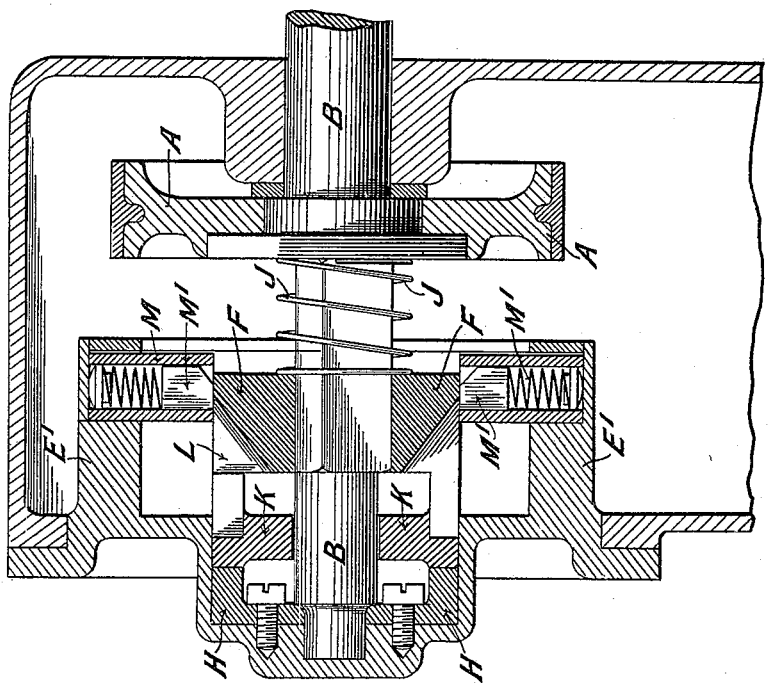

No. 670,204. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 6 Sheets—Sheet 1.
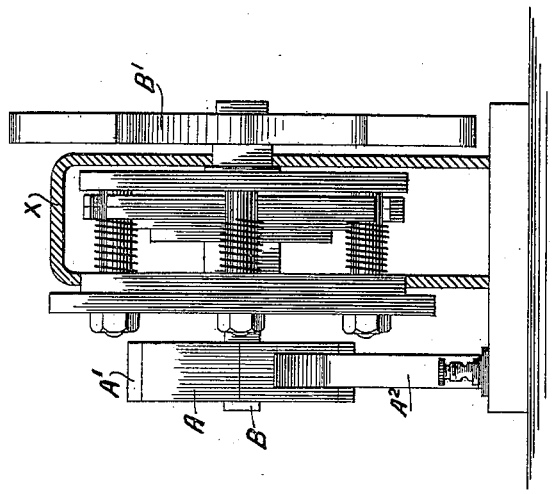
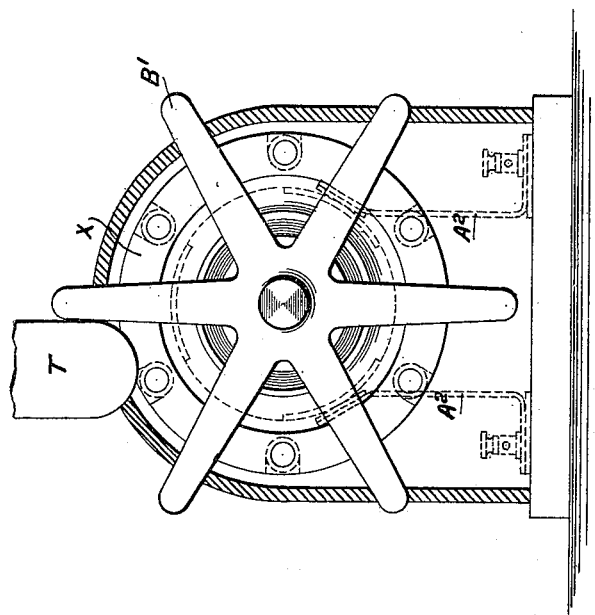

No. 670,204. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 6 Sheets—Sheet 2.

No. 670,204. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 6 Sheets—Sheet 3.
FIG: 5.
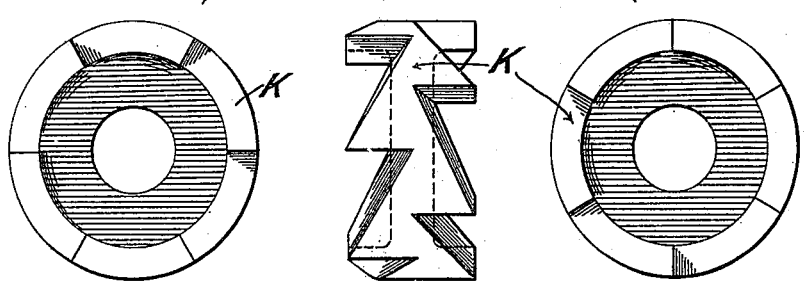
FIG: 6.
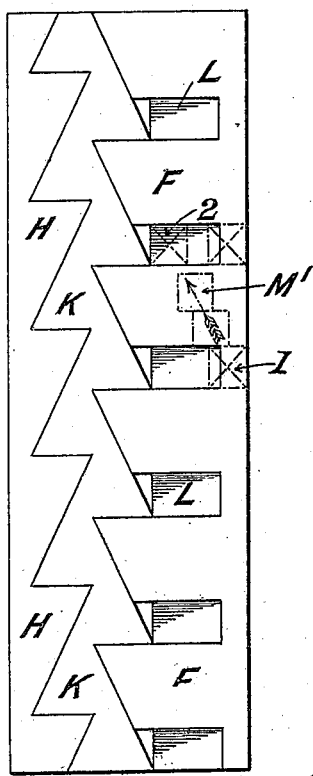
Inventor
William Kingsland
for L. W. Serrell & Son
att'ys
Witnesses
Chas N. Smith
J. Staib No. 670,204. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 6 Sheets—Sheet 4.
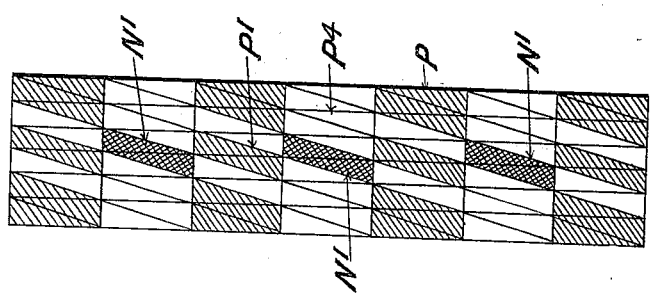
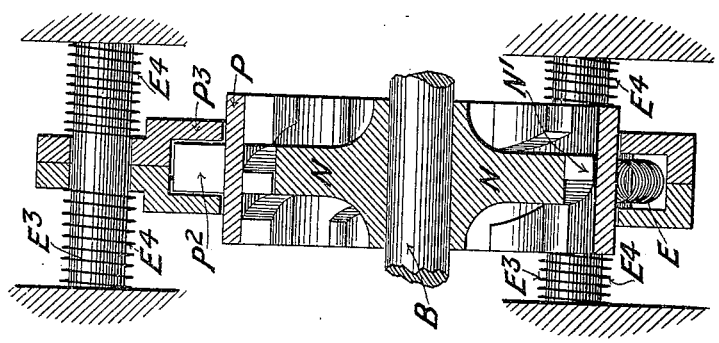
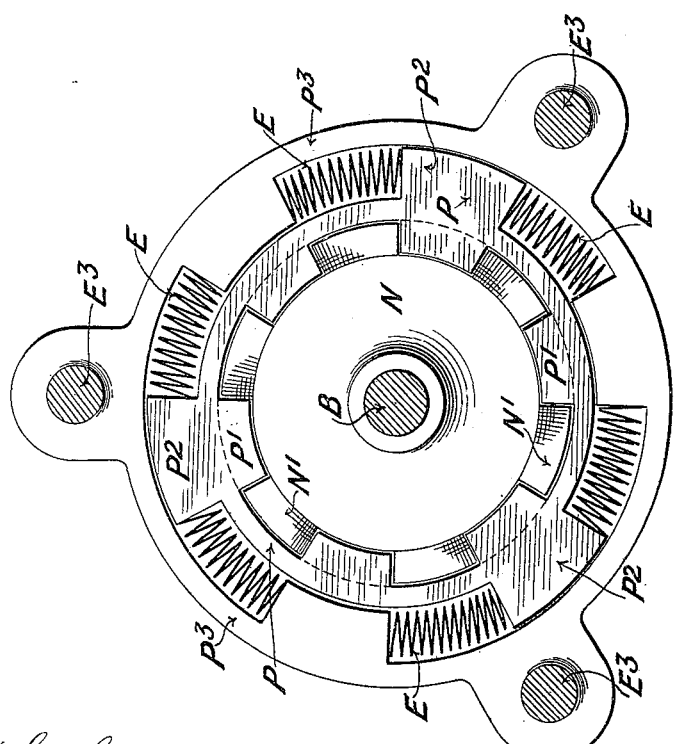

No. 670,204. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 6 Sheets—Sheet 5.
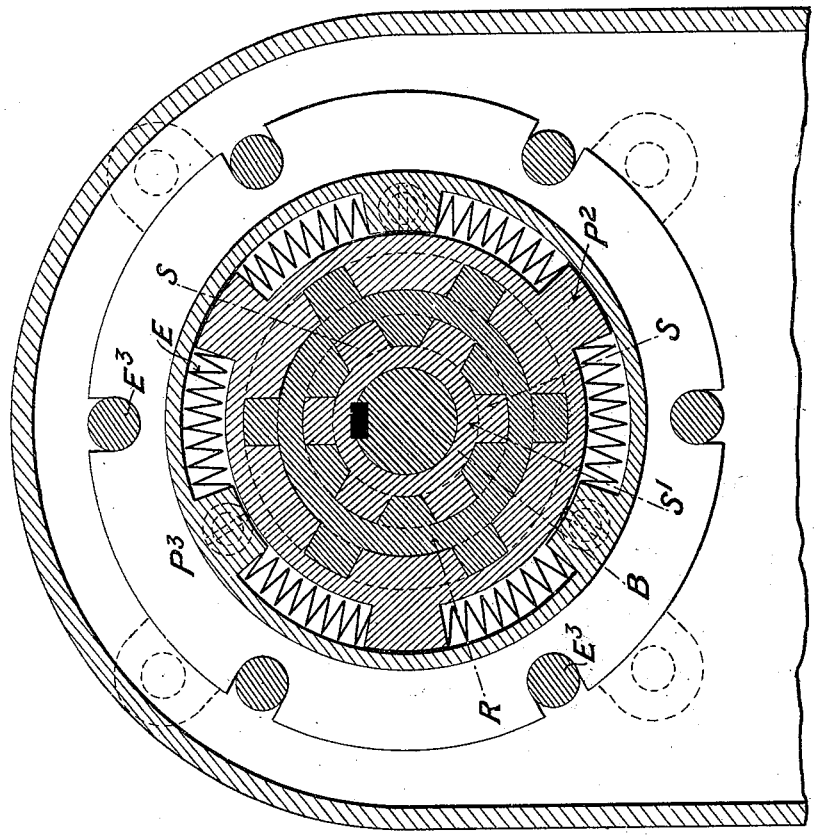
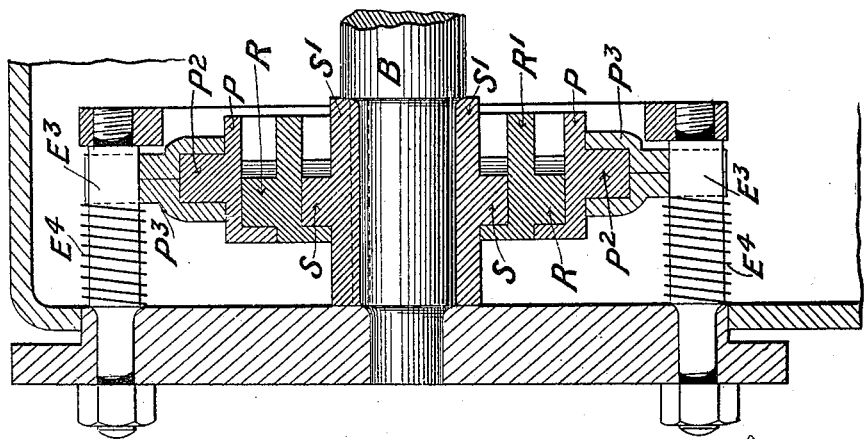

No. 670,204.  
W. KINGSLAND.  
APPARATUS FOR CONTROLLING THE MOTION OF ELECTRICAL SWITCHES.  
(Application filed Aug. 9, 1900.)  
Patented Mar. 19, 1901.
(No Model.) 6 Sheets—Sheet 6.
FIG. 13.
FIG. 12.
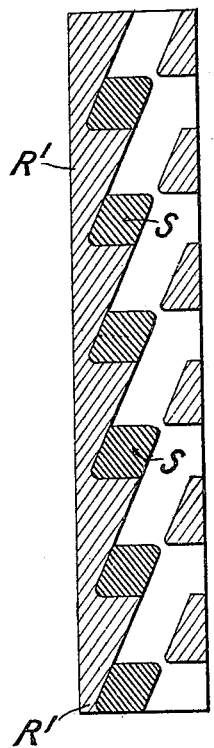
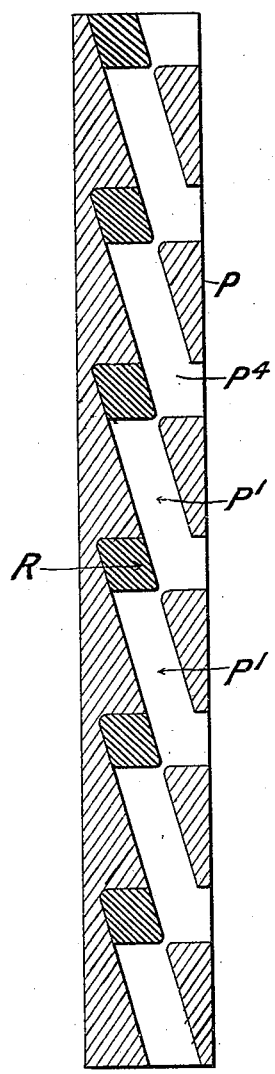
Witnesses  
Chas H. Smith  
J. Staib
Inventor  
William Kingsland  
per L. W. Serrell & Son  
Attys
THE NORRIS PETERS CO., PHOTO-LITHO., WASHINGTON, D. C.

UNITED STATES PATENT OFFICE.

WILLIAM KINGSLAND, OF LONDON, ENGLAND.

APPARATUS FOR CONTROLLING THE MOTION OF ELECTRICAL SWITCHES.

SPECIFICATION forming part of Letters Patent No. 670,204, dated March 19, 1901.

Application filed August 9, 1900. Serial No. 26,320. (No model.)

*To all whom it may concern:*

Be it known that I, WILLIAM KINGSLAND, electrical engineer, of 8 Breams Buildings, Chancery Lane, in the city of London, England, have invented a certain new and useful Apparatus for Controlling the Motion of, Stopping, and Releasing Electrical Switches which are operated by Tappet Action, (for which I have made application for a patent in Great Britain under No. 1,618, dated January 25, 1900,) of which the following is a specification.

In electrical switches which are employed to connect and disconnect an electrical circuit and are operated by means of a tappet action it may and frequently does happen that the moving part or parts of the switch acquire (as the result of such tappet action) greater momentum than is necessary to carry out the required amount of movement of the switch, and that amount of the momentum which is unrequired to effect the requisite change in position of the switch is detrimental in that it may carry the moving part of the switch beyond the position which it is desired it should assume or cause injury to the switch mechanism; and the object of my present invention is to devise means for overcoming these disadvantages. With this object in view I provide mechanism, as hereinafter described, to regulate and control the motion of a rotative shaft by which the switch is operated, the rotative shaft receiving its motion by the impact of a moving tappet bar or bars. Upon this rotative shaft I provide mechanism, which I will hereinafter describe, which will exert a controlling effect or give a certain amount of resistance to the motion of the rotative shaft, and at the proper time or after the shaft has passed through a predetermined period of its motion the said mechanism will automatically definitely stop the motion of the shaft, and having so stopped and located the position which it was desired the shaft should be caused to assume the apparatus immediately releases the shaft and leaves it in a condition to receive the next tappet action.

In some cases the entire mechanism by which the aforesaid results are attained is carried or supported by springs or weights, so as to allow a yielding motion to the action of the tappet and a return motion by the power so stored up, whereby the effect of the impact or shock of the tappet action is absorbed, resulting in a lessened wear of the parts and a lesser liability of injury to the mechanism.

My invention, as aforesaid, is applicable to any switch which is operated by a tappet action, and particularly to switches employed in electrical traction, where the said switches are to be operated mechanically by a tappet-arm carried by or connected to a motor-vehicle moving at various speeds along a line of rails.

Referring to the drawings, Figure 1 is an end elevation of my invention as applied to an electrical switch operated by a tappet action. Fig. 2 is a side elevation of the same. Fig. 3 is a vertical longitudinal section, and Fig. 4 an end view of the stopping and releasing mechanism of the switch. Fig. 5 comprises an elevation and elevations of the opposite sides of the toothed wheel employed in this construction. Fig. 6 is a diagram of the surface development, illustrating the teeth of the engaging wheels. Fig. 7 is a sectional end view of a modification of my invention, wherein a partially screw-threaded regulating-wheel is employed. Fig. 8 is a vertical longitudinal section of the same. Fig. 9 is a diagram showing a development of the engaging partial screw-threads. Fig. 10 is a vertical longitudinal section, and Fig. 11 is a vertical transverse section, of a modification of the devices shown in Figs 7 and 8. Figs. 12 and 13 are diagrams showing developments of the screw-threaded surfaces shown in Figs. 10 and 11.

I will describe my invention, by way of example, in its application to a known rotative form of switch actuated by a tappet action, such as is in part illustrated with reference to Figs. 1 and 2 of the accompanying drawings, Fig. 1 being an end view and Fig. 2 a side elevation of same. This example of switch is composed of a cylinder A, of some insulating material, fixed upon a rotative shaft B and having upon a portion of its circumference a conducting plate or plates A', there being contact springs or brushes A² A², pressing against the surface of the cylinder A and electrically connected, respectively, say, to a main conductor and a sectional conductor in a sectional-conductor system of electrical traction. Mounted upon the rotative shaft B of the switch is a tappet-wheel B′, having several arms, which latter are successively operated by tappets carried by the vehicle as the latter passes along the track in such manner as to give the tappet-wheel B′ a partial turn or partial turns every time a vehicle passes. In such a form of switch mechanism I, as aforesaid, apply my controlling, stop, and releasing mechanism to the rotative shaft B, this mechanism at Figs. 1 and 2 being marked X, and the details of construction of same I will now describe.

Referring to Figs. 3 to 6, B is the rotative shaft, as mentioned with reference to Figs. 1 and 2, and upon this shaft, Fig. 3, I mount a wheel F to be rotated by the shaft, but laterally movable thereon and having its face formed with a number of radial inclined teeth, ratchet fashion, (see the diagram view, Fig. 6,) the number of such teeth corresponding to the number of arms B′ employed in the tappet-wheel. Near to the wheel F aforesaid on the tappet-shaft I provide a second but oppositely-toothed wheel H, which latter is prevented from rotating, being fixed to a stationary part of the framework E′, and I provide an intermediate toothed wheel K, as shown at Figs. 5 and 6, loosely mounted on the tappet-shaft B and located between the stationary wheel H and the laterally-movable wheel F, which wheel F, being mounted on a square part B′ of the shaft B, rotates with the said shaft B. The intermediate wheel K being toothed on each face with teeth which incline in opposite directions, it results that when the wheel F on the tappet-shaft is revolved in one direction it will carry with it the intermediate wheel K and the latter will be forced backward by contact with the stationary wheel H, carrying with it in its lateral motion the wheel F against the action of a spring J on the shaft B′, and there is thus produced the aforesaid controlling effect or resistance to the motion of the shaft B. The wheels K and F are then returned laterally by the spring J after the wheels have rotated the distance of one tooth. When the wheel F is moved in the opposite direction, the intermediate wheel K will not be revolved, but will, so to say, form the acting face of the stationary wheel H, with which it is interlocked.

In order to provide a definite stop action at the termination of the required motion, I form recesses L upon the circular surface of the wheel F, the bases of the recesses being upwardly inclined away from the toothed face of the wheel toward the circular surface thereof, and the number of such recesses L corresponds to the number of arms of the tappet-wheel—*i. e.*, six in the example shown—or are spaced apart according to the distance which the wheel F is required to revolve at one time.

Mounted upon the stationary frame or casting I provide a ring M to carry a plunger or plungers M′, located in radial holes of the ring, the plungers being forced against the periphery of the wheel F by springs and normally resting, as at Fig. 3, (and also indicated by dotted lines at 1 on diagram Fig. 6,) upon the continuous part of the circular surface thereof. Upon the wheel F being partially revolved and at the same time moving laterally the plungers will describe the course indicated upon Fig. 6 and at the completion of the movement of the wheel F through a predetermined distance the plungers M′ will enter a recess, as at 2, Fig. 6, and effect a definite stopping of the wheel F. The wheel F is immediately moved laterally along the shaft B by its spring J and the plunger is forced out of the recess by the inclined base thereof and resumes its normal position relatively to the wheel F, ready for the next motion of the apparatus.

Figure 4:
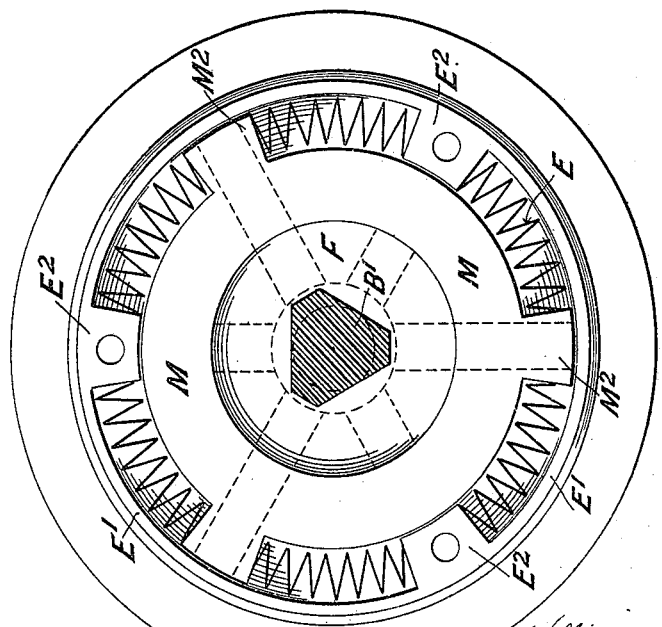

When it is desired that the controlling mechanism should be balanced to allow for the impact of the tappet, I mount the ring M, carrying the stop device, so as to be capable of partial revolution in or on the stationary frame or casing, as shown at Figs. 3 and 4, the latter figure showing the ring M formed with outer projecting lugs M², which are balanced by springs E, acting between buttresses E² on the stationary frame or casing E′. The impact of the tappet will be taken by the springs E, which will return the apparatus to its normal position.

According to another construction of my invention and as illustrated at Figs. 7, 8, and 9, I fix upon the tappet-shaft B what I may term a "regulating-wheel" N, which instead of having teeth upon its face, as shown on the wheel F, Fig. 3, has formed upon its periphery a screw-thread, cut away at regular intervals after the manner of the screw-thread which is frequently employed upon the breech-blocks of breech-loading ordnance. The number of the parts cut away or breaks in the screw-thread is equal to the number of arms on the tappet-wheel—*i. e.*, six in the example now dealt with. Closely surrounding the circumference of the regulating-wheel N is an outer ring P, which is prevented from revolving with the wheel N, but is capable of lateral motion upon stationary slide rails or bars E³ and is held in its normal lateral central position relatively to the regulating-wheel N by means of balancing weights or springs E⁴, Fig. 8. The inner periphery of the outer ring P is formed with a screw-thread P′, cut away at parts, as described with reference to the regulating-wheel N, the thread N′ upon the latter being a male thread and that in the outer ring P a female thread P′, so that when the parts are in a normal or stationary position the parts of the male thread N′ of the regulating-wheel N occupy positions in the cut-away parts P⁴ of the outer ring P, as is indicated in diagram Fig. 9, which shows the development of the inner surface of the ring P and the part threads N′ of the wheel N. By this arrangement when the tappet-shaft B and the regulating-wheel N are operated by the tappet action the segments N' of the male thread of the regulating-wheel N will engage in the female segments of the outer ring P and the latter ring will be moved laterally against the action of one of the springs $E^4$, whereby a certain amount of controlling action will be produced, until the parts of the male thread N' of the regulating-wheel N have moved into the next cut-away parts of the outer ring P, when the parts of the male thread N' of the regulating-wheel N will come into contact with the uncut-away portions of the outer ring P, and the regulating-wheel N will thereby be positively prevented from further rotative movement. The outer ring P is then returned laterally to its normal position by the action of its springs $E^4$, thereby causing the segments of the male thread N' on the regulating-wheel N to again be opposite to spaces in the segments of the female thread P' in the fixed ring P, as in diagram Fig. 9, ready for another motion of the regulating-wheel N to be produced by the next tappet action. Such a device may, if desired, be fitted with balancing arrangements to take up the impact of the tappet and any shock of the stop mechanism should such occur. The application of such a device is shown at Figs. 7 and 8, it being of a similar character to that at Figs. 3 and 4. Thus the ring P may be formed with outer projecting lugs $P^2$, capable of partial rotation within a casing $P^3$, this outer part $P^3$ being capable of lateral motion and being prevented from rotary motion, as previously described, while the inner ring P is capable of a small amount of rotary motion relatively to the outer casing $P^3$, such rotary motion of the inner ring P being regulated by springs E, acting between inwardly-projecting buttresses on the casing $P^3$ and calculated to normally maintain the ring P always in the same position relatively to the casing $P^3$, whereby the shock of the impact of the tappet and the shock of the stoppage of the rotative movement of the tappet-shaft are borne or taken up by the resilient action of the ring P.

In such an arrangement, as at Figs. 7 and 8, it is essential, in order that the tappet-shaft B may be revolved in either direction, that the ring P should be capable of lateral motion also in either direction and be returned in a lateral direction by balancing-springs or equivalents to a normal central position; but in cases where it is considered advisable that the ring P and its casing $P^3$ should only have lateral movement in one direction in whatever direction the tappet-shaft may be partially revolved I modify the construction shown at Figs. 7 to 9, and I have illustrated such modifications at Figs. 10 to 13, to which I will now refer. In this arrangement, as shown at Figs. 10 to 13, the casing $P^3$ is carried on stationary slide-bars $E^3$, which are fixed to the framework, and it is normally forced in one direction by springs $E^4$, acting between the framework and the casing $P^3$ and allowing lateral motion of the casing in one direction. The casing $P^3$, the same as at Fig. 7, carries the ring P, which it holds in the same resilient manner in order to receive the impact of the tappet, and the interior periphery of the ring P is formed with grooves P', (see Fig. 13,) equivalent to female screw-threads, intermediate portions $P^4$ being cut away at regular intervals in somewhat similar manner to that described with reference to Figs. 8 and 9, but slightly differing therefrom in that the intermediate portions $P^4$ are not cut away wholly across the interior periphery. There are shown at R, Fig. 13, the positions of the projecting parts of the equivalent of a male thread formed on an inner ring R', which parts R engage in the aforesaid grooves P' of the ring P. Within the ring R' and fixed on the tappet-shaft B is a regulating-wheel S', also having portions of the equivalent of a male thread S, which engage with grooves equivalent to female screw-threads in the interior of the ring R', the latter and portions of the equivalents S of the male thread being shown in the development diagram 15.

It will be observed that the directions of the grooves at Figs. 12 and 13 are reversed, being equivalent to a right and left handed screw, and it therefore follows that upon the tappet-shaft B being revolved in one direction and carrying with it the regulating-wheel S' the projections S of the latter will act against the inclines of the grooves in the interior of the ring R' and force the said ring laterally, the ring R' not being capable of revolving in this direction with the regulating-wheels S' relatively to the ring P. It will therefore be understood that the ring P, and consequently the casing $P^3$, will be moved laterally against the action of the springs $E^4$ until the projecting parts S of the regulating-wheel are stopped by arriving at the ends of the grooves in which they have been traveling, when the springs $E^4$ will immediately force the casing $P^3$ and the ring R' laterally to their normal positions ready for their next operation. Should the next operation of the tappet-shaft be in the reverse direction to that just described, the regulating-wheel S' will be locked to the ring R' and the latter turning therewith will move the ring P and casing $P^3$ laterally until the ring R' is stopped in its partial rotation by the screw-thread device, when the casing $P^3$ and the ring P will be returned laterally to the normal position ready for the next action.

When it is not required that the controlling, stopping, and releasing device should be elastically supported, the casing $P^3$ may be dispensed with and the ring R' may be carried directly by the stationary slide-bars $E^3$ and controlled by the springs $E^4$, acting against lateral motion, as will be well understood.

What I claim as my invention, and desire to secure by Letters Patent, is—

1. The combination with an electrical switch for connecting and disconnecting an electrical circuit, a rotative shaft by which the switch is operated, and tappet mechanism by which the shaft receives step-by-step rotation by the action of passing tappets; of a wheel mounted on and rotated by the shaft, and inclines formed upon the wheel, a locking-ring, means for holding the ring against rotation, inclines on the ring with which the inclines on the wheel coact to move the ring and wheel apart laterally, a spring to oppose the moving apart of the ring and wheel, and thereby exercise a controlling action on the rotative motion of the said wheel, and means whereby the wheel is momentarily locked at the completion of each required amount of rotary motion, and automatically released to free the shaft for the next tappet action, substantially as set forth.

2. The combination with an electrical switch for connecting and disconnecting an electrical circuit, a rotative shaft by which the switch is operated, and tappet mechanism by which the shaft receives step-by-step rotation by the action of passing tappets; of a wheel mounted on and rotated by the shaft, left-handedly-inclined projections on the periphery of the wheel, a second wheel surrounding the first wheel aforesaid, inclined grooves in the interior of the second wheel to receive the projections of the first wheel, right-handedly-inclined projections upon the exterior periphery of the second wheel to enter similarly-inclined grooves in a surrounding ring, means for holding the ring against rotation and for allowing the same to be moved laterally, and springs to oppose such lateral movement of the ring substantially as set forth.

3. The combination with an electrical switch for connecting and disconnecting an electrical circuit, a rotative shaft by which the switch is operated, and tappet mechanism by which the shaft receives step-by-step rotation by the action of passing tappets; of a wheel mounted on and rotated by the shaft, left-handedly-inclined projections on the periphery of the wheel, a second wheel surrounding the first wheel, inclined grooves in the interior of the second wheel to receive the projections of the first wheel, right-handedly-inclined projections upon the exterior periphery of the second wheel to enter similarly-inclined grooves in a surrounding ring, the lateral guides to carry the ring, to prevent rotation thereof and to permit of the ring moving laterally, and springs to oppose such lateral movement of the ring substantially as set forth.

4. The combination with an electrical switch for connecting and disconnecting an electrical circuit, a rotative shaft by which the switch is operated, and tappet mechanism by which the shaft receives step-by-step rotation by the action of passing tappets; of a wheel mounted on and rotated by the shaft, left-handedly-inclined projections on the periphery of the wheel, a second wheel surrounding the first wheel, inclined grooves in the interior of the second wheel to receive the projections of the first wheel, right-handedly-inclined projections upon the exterior periphery of the second wheel to enter similarly-inclined grooves in a surrounding ring, an annular casing to carry the ring, lugs on the ring to enter segmental grooves in the interior periphery of the casing, and springs in the segmental grooves to elastically balance the ring and permit the latter to have a limited resilient motion, lateral guides to carry the casing to prevent rotation thereof and to permit of the casing moving laterally, and springs to oppose such lateral movement of the casing substantially as set forth.

WILLIAM KINGSLAND.

Witnesses:
GRIFFITH BREWER,
T. W. ROGERS.